United States Patent [19]
Aoi et al.

[11] Patent Number: 6,014,275
[45] Date of Patent: *Jan. 11, 2000

[54] MAGNETIC RECORDING DRIVE

[75] Inventors: Hajime Aoi, Tachikawa; Toshiaki Tsuyoshi, Odawara; Makoto Koizumi, Akigawa; Nobumasa Nishiyama, Odawara; Yoshibumi Matsuda, Odawara; Takuji Ogawa, Odawara; Kazuhisa Shiraishi, Odawara, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/701,705

[22] Filed: Aug. 22, 1996

Related U.S. Application Data

[62] Division of application No. 08/305,193, Sep. 13, 1994, Pat. No. 5,572,379.

[30] Foreign Application Priority Data

Sep. 13, 1993 [JP] Japan ................................. 5-226850

[51] Int. Cl.⁷ ..................................................... G11B 5/03
[52] U.S. Cl. ................................. 360/46; 360/66; 360/67
[58] Field of Search .................................. 360/46, 66, 67

[56] References Cited

U.S. PATENT DOCUMENTS

| | | |
|---|---|---|
| 4,833,559 | 5/1989 | Belk . |
| 5,282,104 | 1/1994 | Coutellier et al. . |
| 5,323,278 | 6/1994 | Contreras et al. ..................... 360/67 |
| 5,325,242 | 6/1994 | Fukuchi et al. . |
| 5,357,379 | 10/1994 | Gower ................................. 360/46 |
| 5,367,411 | 11/1994 | Nishiyama et al. . |
| 5,412,518 | 5/1995 | Christner et al. . |
| 5,523,898 | 6/1996 | Jove et al. ........................... 360/66 |

FOREIGN PATENT DOCUMENTS 5298841  11/1993  Japan .

OTHER PUBLICATIONS

"Extended Life Magnetoresistive Head", IBM Technical Disclosure Bulletin, vol. 17, No. 9, pp. 2811, Feb. 1975.

"Adjustable Read Bias Current for Enhanced Head Reliability", IBM Technical Disclosure Bulletin, vol. 33, No. 5, pp. 391–393, Oct. 1990.

"Optical Method of Increasing Life of Magnetoresistive Head in Sector Servo", IBM Technical Disclosure Bulletin, vol. 34, No. 6, pp. 426–427, Nov. 1991.

"Multi–Rate Servo For The Reduction of Magneto–Resistive Head "ON" Time", IBM Technical Disclosure Bulletin, vol. 33, No. 4, pp. 352–353, Sep. 1990.

*Primary Examiner*—Aristotelis M. Psitos
*Assistant Examiner*—Kin Wong
*Attorney, Agent, or Firm*—Antonelli, Terry, Stout & Kraus, LLP

[57] ABSTRACT

In a magnetic recording drive having a plurality of magnetic heads each employing a magnetoresistive sensor for the purpose of averaging the time required for sense currents to be caused to flow through the respective magnetoresistive sensors to shorten the longest reproducing time and to suppress the degradation of the characteristics due to the electromigration, thereby improving the reliability of the magnetic recording drive, the magnetic recording drive includes circuits for averaging the useful life depending on the currents caused to flow through the respective magnetoresistive sensors among the plurality of magnetic heads, whereby the time required for the sense current to be caused to flow through one MR reproducing head is greatly shortened. Therefore, the levels of outputs of the MR reproducing heads can be increased without reduction of the reliability and thus the reliability of the magnetic recording drive can be improved.

6 Claims, 6 Drawing Sheets

(0) DATA FORMAT (1) IN WRITE OPERATION (SECTOR "1")

(2) IN READ OPERATION (SECTOR "1")

(3) IN FOLLOWING OPERATION (IN ACCESS OPERATION)

MIGRATION

MAGNETIC RECORDING DRIVE

This application is a CPA of U.S. Ser. No. 08/701,705 filed Aug. 22, 1996 now abandoned which is a 37 CFR § 1.60 divisional of prior U.S. application Ser. No. 08/305,193, filed Sep. 13, 1994 and now U.S. Pat. No. 5,572,379.

BACKGROUND OF THE INVENTION

The present invention relates, in general, to a magnetic recording drive, utilizing magnetic recording, such as a magnetic disc drive, a magnetic tape drive, and a magnetic floppy disc drive.

A magnetoresistive (MR) sensor operates to detect a leakage magnetic field from a recorded magnetic transition by utilizing the fact that the resistivity of the sensor depends on the leakage magnetic field. Therefore, when the magnitude of the sense current which flows through the sensor is increased, the large reproduced output signal is obtained irrespective of the relative speed between the head and the medium such as disc and tape. For this reason, the magnetoresistive sensor has been widely used in the reproducing heads of the high density magnetic recording drives. However, in order to obtain the large output, the magnitude of the current (the sensor current), which flows through the magnetoresistive (MR) sensor, needs to be increased. On the other hand, since the sense current flows through a very thin MR sensor layer, it is necessary to prevent disconnection due to electromigration and the like. For this purpose, heretofore, only during the operation for reproducing the recorded signals, the sense current was caused to flow through the MR sensor.

Along with the promotion of high density in the magnetic disc drive, it is desired to improve the head sensitivity to secure the read operation of the reproduced output. Thus, if a large reproduced output is intended to be obtained by increasing the sense current which flows through the MR sensor, since in general, the current density of the sense current is so large as to be $10^7$ A/cm$^2$ or so, in terms of the useful life of the sensor, there arises the problem that the sensor is degraded due to the electromigration or the acceleration of the electromigration due to a temperature rise during operation.

In addition, for the purpose of increasing the track density, in order to improve the head positioning accuracy, the embedded sector servo utilizing the positioning signal on the data surface has been widely used. Then, if in this method, the magnetoresistive (MR) sensor is used for reproducing both the recorded read-write (R-W) data and the positioning signal, the following problem will arise. In the embedded sector servo method including the reproducing operation, the positioning signal is always reproduced which is recorded in each portion which is called the sector and is concentrically distributed in a fan shape on the magnetic disc. Therefore, after the reproducing of R/W data has been performed by using a certain head, a following operation is continued while the positioning signal is reproduced by the same head until the next instruction of a R/W is issued. Therefore, in the case of head which has to read out the information having the high reproducing frequency such as a directory, the total reproducing time of the MR head including the time required for the positioning signal is remarkably increased as compared with other heads.

For example, the case of the magnetic disc drive having the following specification will hereinbelow be discussed.

(1) Number of sectors: 82 sectors/track Positioning signal: 99 Bytes/sensor (including ID portions) Frequency of occurrence of recording/reproducing operation: 5 times/sec Amount of look ahead cache data: 2 tracks Number of heads: 15 heads Rotation of frequency of the disc: 4,500 rpm The operating conditions of the above-mentioned disc drive are set as follows.

(2) Useful life: 500,000 hours Operating time: 12 hours/day Ratio of recording to reproducing: 1/3

FIG. 1 shows the data format of each track. As can be seen from the figure, each track includes, but is not limited to, a track ID portion and a plurality of sector portions which follow an INDEX representing a starting point of the track. In each sector, the positioning signal is recorded in the head portion thereof, and next both an ID portion and a data portion of the sector are recorded. Therefore, the selected head always continues to reproduce the positioning signal for the following operation. On the other hand, in the recording and reproducing modes, the ID portion is also read out, and the objective sector is found out. After the ID portion has coincided with the objective value, in the recording mode, the recording of the data is performed. In the reproducing mode, on the heels of the reproducing of the sector to be reproduced, in general, the look ahead for one or two tracks is performed.

Therefore, the following results are obtained.

(3) Total R/W data reproducing time: 4,990 hours (4) Total positioning signal reproducing time: 3,800 hours As described above, for a period of time ranging from a time point when the recording or reproducing operation has been temporarily completed up to a time point when the subsequent recording or reproducing is performed, the same head HDn is selected. For that period of time, the positioning signal in the following operation will be also reproduced with the same head HDn. As the excessive case, if it is assumed that the processings are concentrated on one head, it takes in total 8,790 hours, i.e., 366 days. Thus, it is very difficult to ensure the useful life of the magnetoresistive sensor type head in the above-mentioned high current density state.

SUMMARY OF THE INVENTION

It is therefore an object of the present invention to provide a magnetic disc drive, for performing the positioning operation using the embedded sector servo method, which is capable of managing the current flowing time of the sense current caused to flow through the magnetoresistive sensor and of decreasing the time required for the sense current having the necessary magnitude to be caused to flow in the reproducing of the recorded signals as much as possible, thereby improving the useful life of the magnetoresistive effect sensor.

The above-mentioned problems associated with the prior art can be solved by controlling the maximum reproducing time of each head in the following operation so as to cause the total reproducing time of each head, including the time required for the following operation and the reproducing, to be fixed.

In addition, in the operation other than the reproducing of the recorded signals, i.e., during the following operation, the sense currents which are caused to flow through the respective magnetoresistive sensors are equivalently decreased, whereby the improvement in the reliability can be attained more effectively.

The feature of this invention is a magnetic recording drive, having a plurality of magnetic heads each employing a magnetoresistive sensor, which may provide means for averaging the useful life due to currents caused to flow through the respective magnetoresistive sensors among the plurality of magnetic heads.

The second feature of this invention is a magnetic recording drive which may provide means for switching the magnetic heads in turn in the following operation in such a way that the accumulating total of the data reproducing time in the magnetic heads described in the paragraph (1) and the time required for the positioning data reproducing, which is performed in both the seek operation and the following operation are averaged among the magnetic heads.

The third feature of this invention is a magnetic recording drive which may provide means for switching, in the following operation described above the magnetic heads, except for the magnetic head or heads having the longer total reproducing time, so as to increase the magnetic head number, and switching, at the time when a maximum magnetic head number is obtained, conversely, the magnetic heads, except for the magnetic head or heads having the longer reproducing time, to the magnetic heads having the smaller magnetic head numbers in turn.

The fourth feature of this invention is a magnetic recording drive, having a plurality of magnetic heads each employing a magnetoresistive sensor, which may provide means for switching the magnetic heads at the time points different from those when the magnetic heads are switched along with the recording or reproducing of the data.

The fifth feature of this invention is a magnetic recording drive which may provide means for switching the magnetic heads in turn in the following operation in such a way that the accumulating total of the data reproducing time in the magnetic heads described above and the time of the positioning data reproducing, which is performed in both the seek operation and the following operation are averaged among the magnetic heads.

The sixth feature of this invention is a magnetic recording drive which may provide means for switching, in the following operation described above, the magnetic heads, except for the magnetic head or heads having the longer total reproducing time, so as to increase the magnetic head number, and switching, at the time when a maximum magnetic head number is obtained, conversely, the magnetic heads, except for the magnetic head or heads having the longer reproducing time, to the magnetic heads having the smaller magnetic head numbers in turn.

The seventh feature of this invention is a magnetic recording drive, having a plurality of magnetic heads each employing a magnetoresistive sensor, which may provide means for switching the magnetic heads for successive two data recording or reproducing periods.

The eighth feature of this invention is a magnetic recording drive which may provide means for switching the magnetic heads in turn in the following operation in such a way that the accumulating total of the data reproducing time in the magnetic heads described above and the time of the positioning data reproducing, which is performed in both the seek operation and the following operation are averaged among the magnetic heads.

The ninth feature of this invention is a magnetic recording drive which may provide means for switching, in the following operation described above, the magnetic heads, except for the magnetic head or heads having the longer total reproducing time, so as to increase the magnetic head number, and switching, at the time when a maximum magnetic head number is obtained, conversely, the magnetic heads, except for the magnetic head or heads having the longer reproducing time, to the magnetic heads having the smaller magnetic head numbers in turn.

The tenth feature of this invention is a magnetic recording drive, having at least magnetic discs, magnetic heads, an actuator, a voice coil motor and an R-W circuit and employing magnetoresistive sensors to reproduce signals recorded in the medium e.g., magnetic disk, which may provide means for averaging the total signal reproducing time of the magnetoresistive sensors.

The eleventh feature of this invention is a magnetic recording drive which may provide including means for switching the magnetic heads in turn in the following operation in such a way that the accumulating total of the data reproducing time in the magnetic heads described above and the time of the positioning data reproducing, which is performed in both the seek operation and the following operation are averaged among the magnetic heads.

The twelfth feature of this invention is a magnetic recording drive which may provide means for switching, in the following operation described above, the magnetic heads, except for the magnetic head or heads having the longer total reproducing time, so as to increase the magnetic head number, and switching, at the time when a maximum magnetic head number is obtained, conversely, the magnetic heads, except for the magnetic head or heads having the longer reproducing time, to the magnetic heads having the smaller magnetic head numbers in turn.

The thirteenth feature of this invention is a magnetic recording drive, having at least magnetic discs, magnetic heads, an actuator, a voice coil motor and an R-W circuit and employing magnetoresistive sensors to reproduce signals recorded in the medium, which may provide that currents which are caused to flow through the respective sensors in a state other than the signal reproducing state in the magnetoresistive sensors are equivalently reduced to smaller than that in the signal reproducing operation.

The fourteenth feature of this invention is a magnetic recording drive which may provide that in the following operation described above, the sense currents which are caused to flow through the respective magnetoresistive sensors are reduced.

The fifteenth feature of this invention is a magnetic recording drive which may provide that the rate of reducing the sense currents described above is equal to or lower than ½.

The sixteenth feature of this invention is a magnetic recording drive which may provide that the rate of reducing the sense currents described in the paragraph (13) is equal to or lower than ¼.

The seventeenth feature of this invention is a magnetic recording drive which may provide means for making, in the following operation described above, the sense currents, which are caused to flow through the respective magnetoresistive effect sensors, zero.

The eighteenth feature of this invention is a magnetic recording drive which may provide that in the following operation described above, the reproducing of the positioning data is not performed with respect to all the positioning data, but is performed with respect to the discontinuous positioning data.

The nineteenth feature of this invention is a magnetic recording drive which may provide that the reproducing intervals of the positioning data, which is reproduced above following operation described in the are made discontinuous, and the sense currents, which are caused to flow through the respective magnetoresistive sensors, are reduced.

The twentieth feature of this invention is a magnetic recording drive which may provide means for averaging, in the following operation described above, the total signal reproducing time of the magnetoresistive sensors.

In the magnetic disc drive, in general, as compared with the time required for the recording or reproducing operation, the time, other than that time, required for the seek operation and the following operation is overpoweringly long. Therefore, the positioning signal reproducing time in both the seek operation and the following operation has a great influence on the useful life of each magnetoresistive sensor. Therefore, if the time required for only the following operation to be performed is equally assigned to the magnetoresistive sensors by the above-mentioned means, the optimal current flowing time per magnetoresistive sensor can be largely reduced in the example of the above-mentioned disc drive as follows.

$$366 \text{ days}/15 = 24.4 \text{ days} = 585.6 \text{ hours}$$

As a result, the possibility of the disconnection breakdown of the magnetoresistive sensor can be largely mitigated.

DESCRIPTION OF THE PREFERRED EMBODIMENTS

The preferred embodiments of the present invention will hereinafter be described with reference to the accompanying drawings.
(Embodiment 1)

Figure 1:
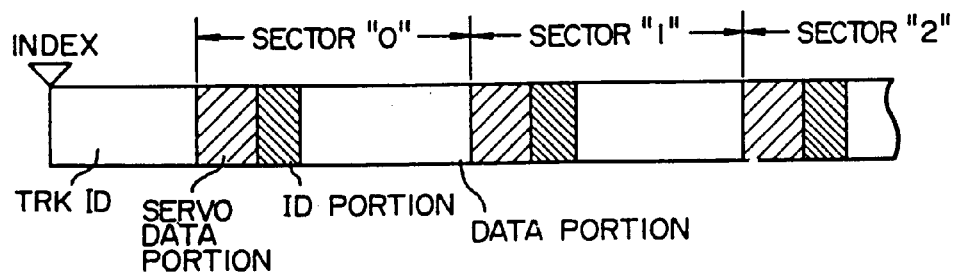
FIG. 1 is a view showing a track format useful in explaining the present invention.
Figure 1:
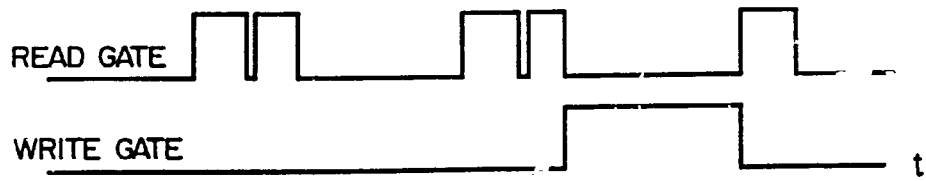
Figure 1:
Figure 1:
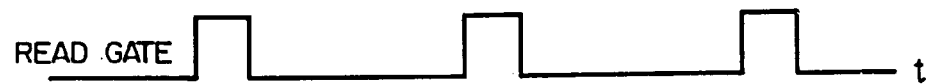
Figure 2:
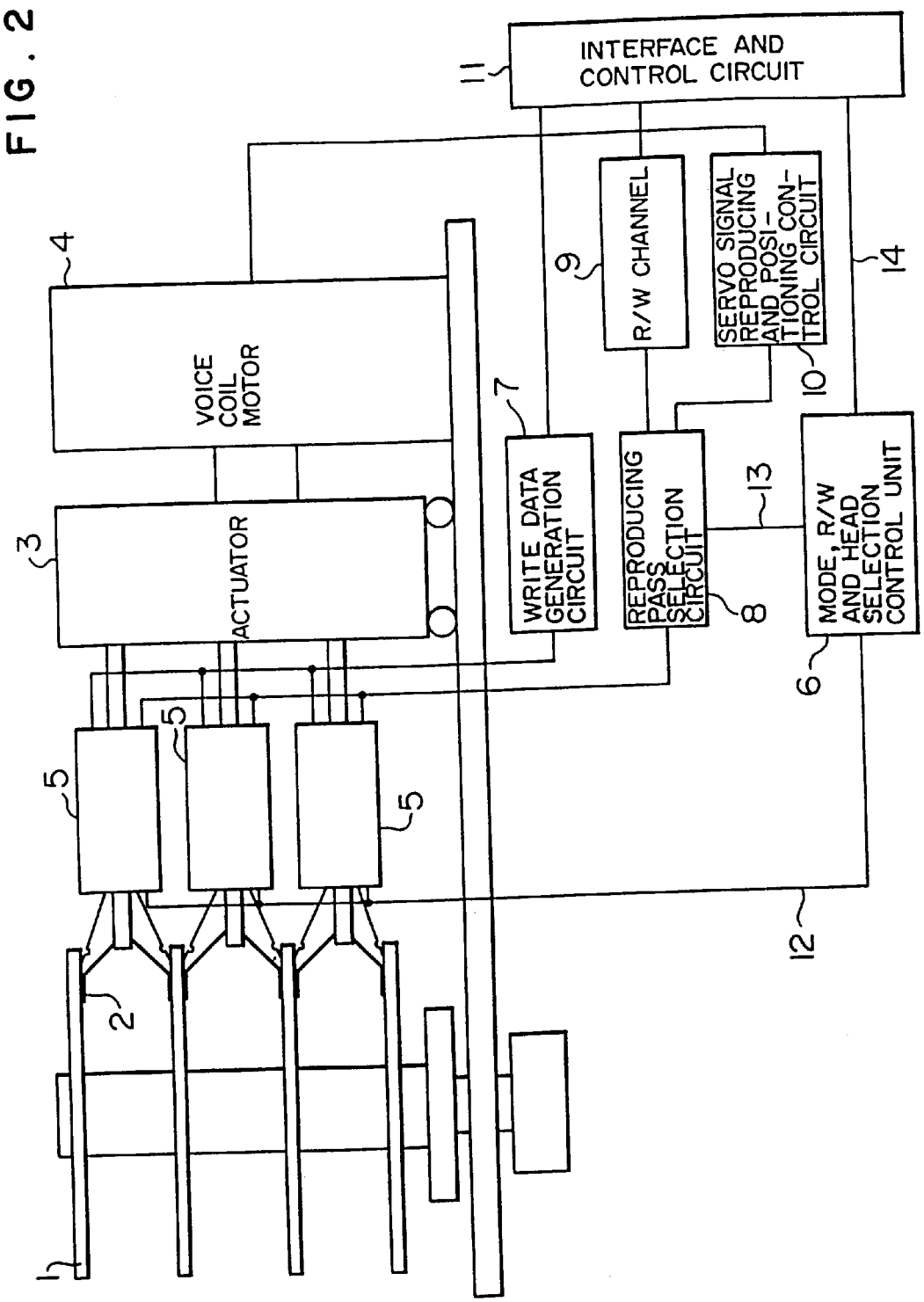
FIG. 2 is a block diagram, partly in cross sectional view, showing a configuration of a magnetic recording drive of the present invention.

First, a first embodiment of the present invention will hereinbelow be described in detail. As shown in FIG. 2, a magnetic recording drive of the present embodiment includes, but is not limited to, one or a plurality of magnetic discs 1, magnetoresistive (MR) sensor reproducing composite heads 2 which are provided in correspondence to the number of magnetic discs, an actuator 3, a voice coil motor 4, R/W amplifiers 5, a mode, R/W and head selection control circuit 6, a write data generation circuit 7, a reproducing pass selection circuit 8, an R/W channel 9, a servo signal reproducing and positioning control circuit 10, an interface and control circuit 11 and the like. In FIG. 2, the actuator 3 and the voice coil motor 4 are shown in the form of a linear actuator. However, in the case, as well, where a rotary actuator which is widely used in the small disc drives is used for the actuator 3 and the voice coil motor 4, similarly, this example can be embodied.

The MR sensor reproducing composite heads 2 are numbered HDn (n=1, 2, 3, . . . , m). In this connection, the integral number m corresponds to the total mounting number of heads. The mode, R/W and head selection control circuit 6 operates to control the reproducing pass process for the positioning signal and the recorded signal through the reproducing pass selection circuit 8. By the operations of those circuits, the current flowing time of the sense currents which are caused to flow through the respective reproducing heads each constituted by the magnetoresistive (MR) sensor is averaged.

Figure 3:
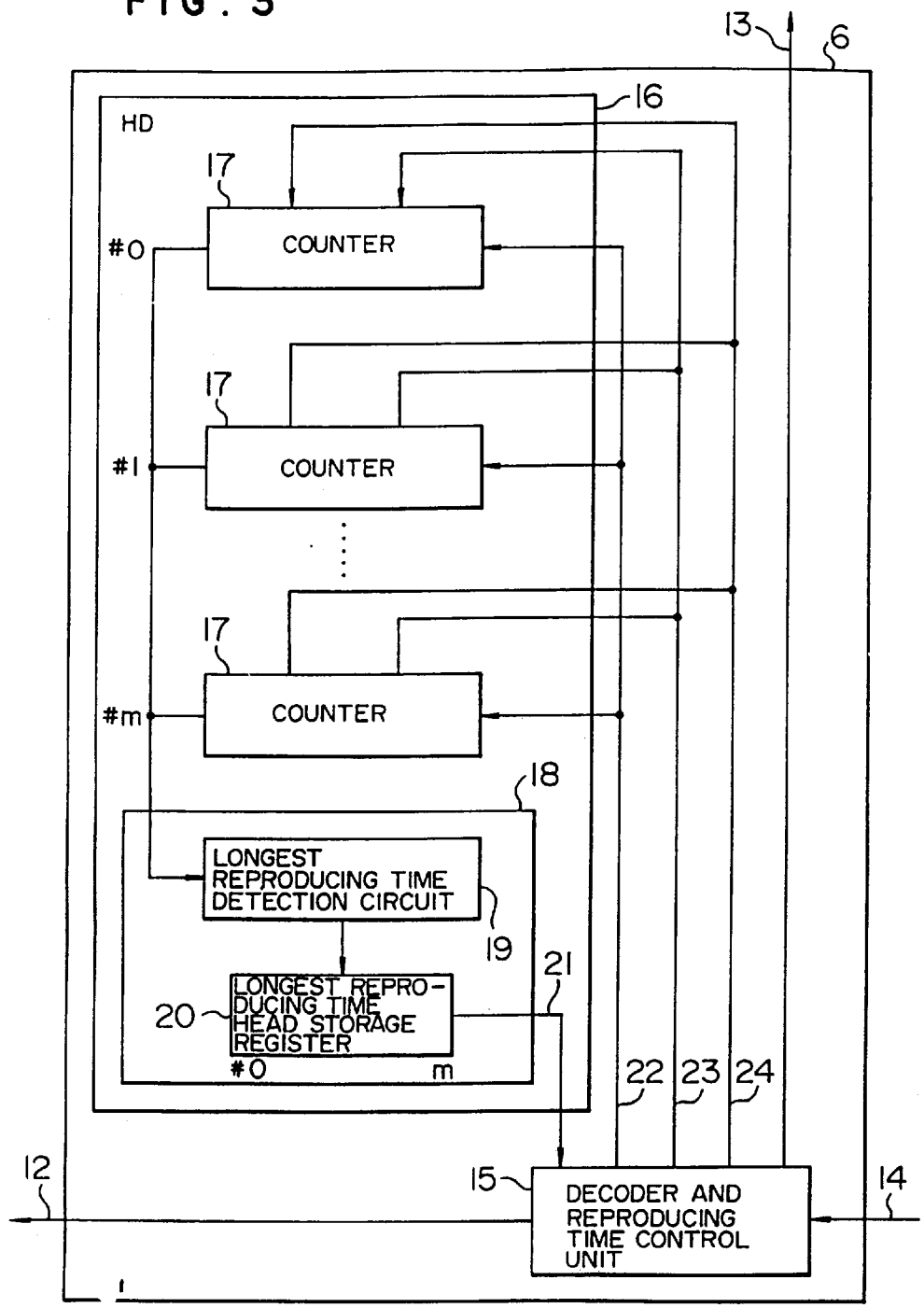
FIG. 3 is a block diagram showing a configuration of a circuit for selecting and controlling a mode, R/W and a head in an embodiment 1.

The mode, R/W and head selection control circuit 6 includes, but is not limited to, a decoder and reproducing time control circuit 15 and a reproducing time difference memory circuit 16 which operate to analyze an R-W control signal 14 sent from the interface control circuit 11. The decoder and reproducing time control circuit 15 operates to perform, on the basis of the information in the reproducing time difference memory circuit 16, the control of the positioning signal reproducing in both the seek operation and the following operation so as for the reproducing time of the MR reproducing heads to be uniform. Therefore, the decoder and reproducing time control circuit 15 generates a signal 12 which is used to perform the control of the operation of the R/W amplifiers 5 and the suitable control of the heads, and a signal 13 which is used to control the reproducing pass selection circuit 8. As an example of the reproducing time difference memory circuit 16, there is shown in FIG. 3 the specific case where that circuit 16 is constituted by a plurality of UP counters 17 which are provided in correspondence to the heads. In this connection, each UP counter 17 has the nonvolatile characteristics in order to store the data relating to the accumulated time.

Figure 4:
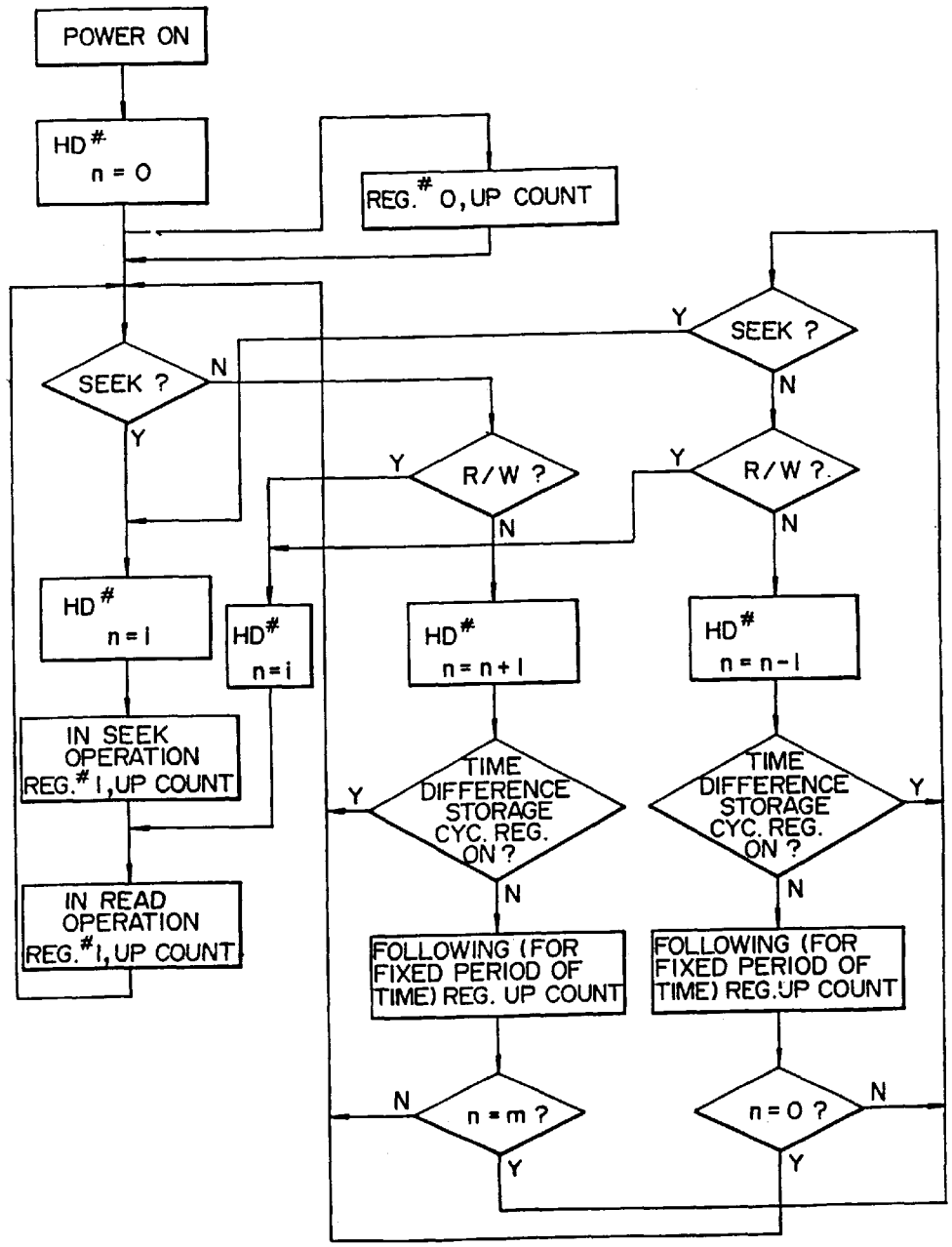
FIG. 4 is a flow chart useful in explaining a method of selecting and controlling a servo head in the embodiment 1.

Now, the description will hereinbelow be given with respect to a method of selecting the above-mentioned servo heads with reference to a flow chart of FIG. 4. After turning the power source of the drive on, in general, the directory information is read out by the head HD0, and then is transferred to a processor. The data relating to the reproducing time is stored in the reproducing time difference memory circuit 16 by using both an ID signal reproducing count signal 23 and a sector recorded signal reproducing count signal 24. A position signal reproducing count signal 22, the ID signal reproducing count signal 23 and the sector recorded signal reproducing count signal 24 are, in correspondence to the respective lengths, input to the corresponding bits in each counter.

Next, until the recording or reproducing in the first head is started, the following operation is performed for a fixed period of time while increasing successively the head number. For that period of time, by the position signal reproducing count signal 22 which corresponds to the following time every head and is generated every sector, the data relating to the reproducing time is stored in the UP counters 17 corresponding to the respective heads.

The first head HDi (0≦i≦m) is selected, and both the seek operation and the R/W operation are performed. For that period of time, in correspondence to the seek, the waiting of rotation, and the positioning time, ID reproducing time and the disc storage information reproducing time in the R/W operation in the head HDi, the content of the counter of the head HDi is counted up. At the time point when the reproducing operation has been completed, the (i+1)th head HDi+1 is selected. Then, after the following operation has been performed for a fixed period of time, as long as the processing does not enter into the R/W operation, the count-up is performed one by one in such a way that the counters are switched successively in the order of HDi+2, HDi+3, HDi+4, . . . , HDm. Subsequently, the count-down is performed one by one in such a way that the counters are switched in the order of HD(m−1), HD(m−2), . . . , HD1 and HD0 in turn. In addition, as long as the processing does not enter into the R/W operation, the processing is returned to the count-up process, and then the above-mentioned processes are repeatedly executed.

In this connection, in order to make the reproducing time in the individual heads fixed, the switching of the heads needs to be performed so as to perform the following operation except for the head or heads having the larger reproducing time. For this purpose, by utilizing the information of the counters 17 in which the data relating to the time elapsed to perform the R-W operation for the heads is stored, the most significant bit of the reproducing time the data of which is stored in the counters 17 is detected by a circuit 19 for detecting the longest reproducing time which is provided in the reproducing time difference detection circuit 18, and the data relating to the head showing that the most significant bit is "1", i.e., the reproducing having the longest reproducing time has been performed is shown to a longest reproducing time head storage register 20. Then, except for the head which has been shown by a longest time head register output signal 21 sent from that register 20, the count-down operation and the counting-up operation are performed with respect to other heads HD.

The fixed following time can be selected from the time required for the disc to make one rotation to 10 sec or so. However, in terms of the fine reproducing time control, as for the fixed following time, the time interval which is as short as possible is desirable.

The above-mentioned embodiment has been described by taking the fixed length recording method, which is widely used in the small disc drives for personal use, as an example. However, it is, of course, to be understood that the above-mentioned embodiment may also be applied similarly to the architecture in which the positioning signals are embedded at regular intervals in the variable length recording architecture which is widely used in the disc drives for the main frame.

(Embodiment 2)

A second embodiment is constructed in such a way that in the magnetic recording drive having the same structure, shown in FIG. 2, as that of the first embodiment, in order to reduce the influence of the reproducing time in the following operation, the magnitude of the sense currents which are caused to flow through the respective MR heads in the following operation is greatly reduced.

Figure 5:
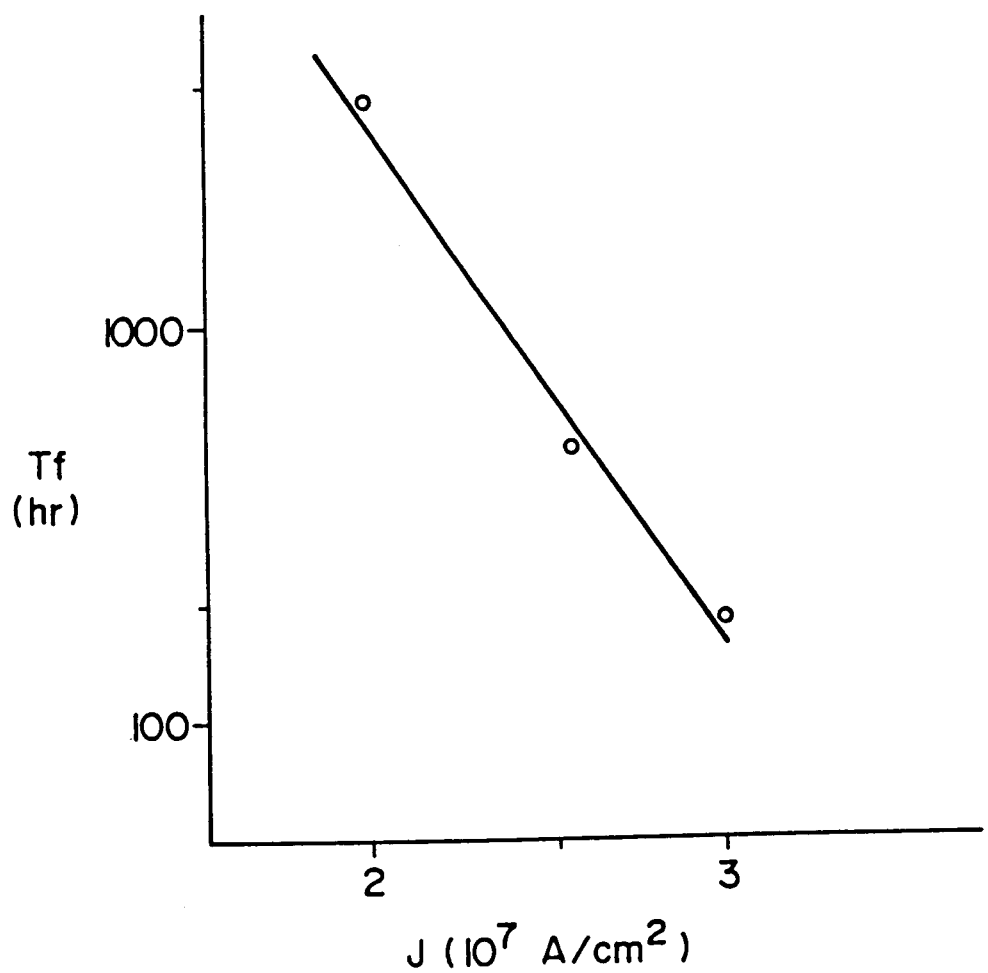
FIG. 5 is a graphical representation showing the relationship between the useful life of the sensor and the sensor current density.
Figure 6:
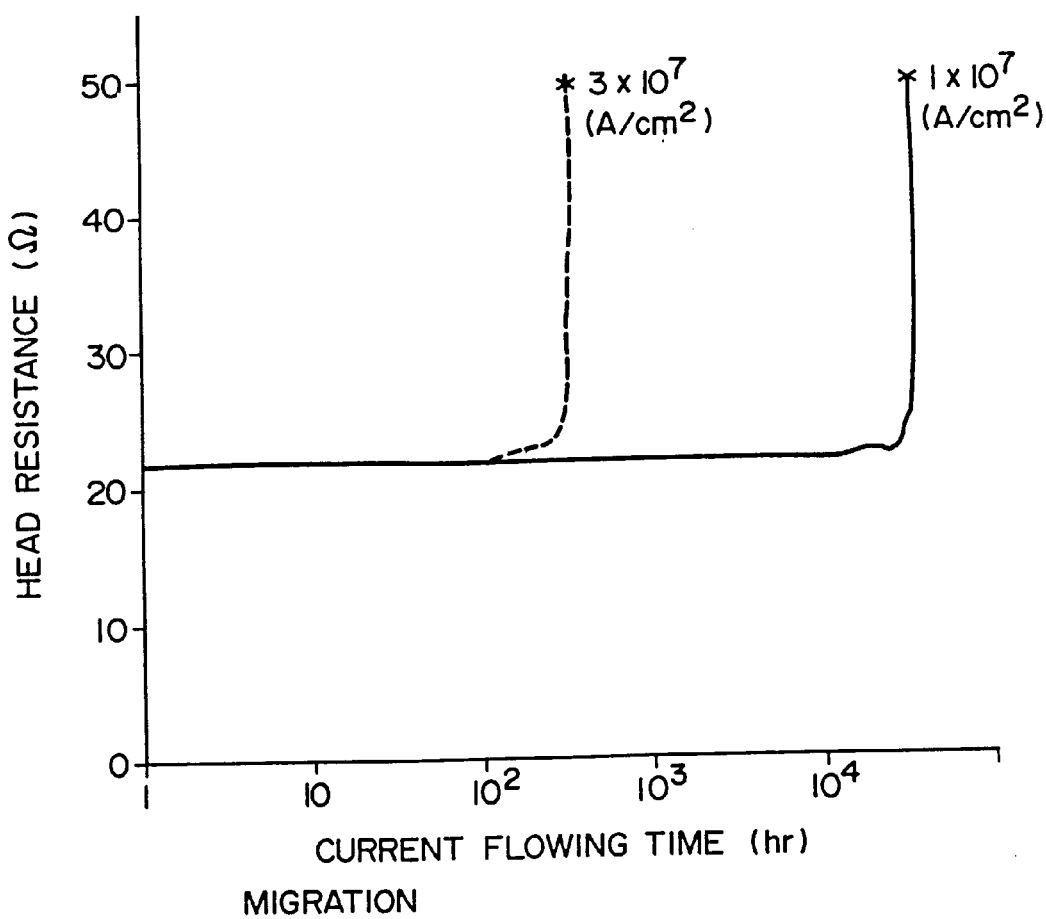
FIG. 6 is a graphical representation showing the fact that when increasing the current, the electromigration occurs.

An example of the relationship between the sense current density J and the head useful life Tf is shown in FIG. 5. The graph shown in FIG. 5 is obtained from the change in the current flow dependency of the head resistance, plotted for the sense current density as a parameter, shown in FIG. 6. As apparent from FIG. 5, the following relationship is established.

$$Tf J^{-5.2} \tag{1}$$

From Expression (1), in order to increase the head useful life Tf two fold and to reduce the influence of the following time, the sense current density J may be multiplied by 0.4, i.e., approximately halved. In addition, in order to further reduce the influence of the following time, if it is an object that the head useful life Tf is increased by three fold, it is enough that the sense current density J may be approximately quartered. As a result, although the S/N ratio in the positioning is also decreased, the decreasing rate thereof is in the range of ¼ or so to ½ or more. In addition, the high positioning accuracy which is required for the R-W operation is not required for the following operation. Therefore, reducing the MR sense current during following operation becomes possible. In addition, in the case of the disc drives suitable for the portable apparatuses, in terms of reduction of the consumed power as well, it is also possible to make the sense currents in the following operation zero.

Further, the intervals at which the positioning signal is reproduced in the following operation are changed from the intervals every sector in the recording operation to the several-sector intervals, whereby the same effects can be obtained.

Those methods may be combined with the first embodiment, and as a result, the more advantageous effects can be expected.

Figure 7:
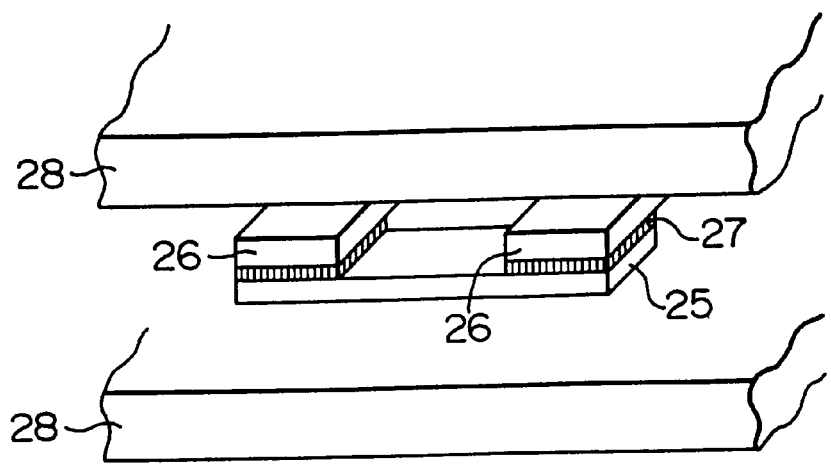
FIG. 7 is a perspective view showing a structure of an MR head employed in the present invention.

FIG. 7 shows the structure of the MR head which is employed in the first and second embodiments. This structure is such that an MR film 25 and an electrode 26 are formed through a magnetic domain control film 27 so as to confront each other, and those films are covered with a shielding film 28.

According to the present invention, in the magnetic disc drive in which the magnetoresistive sensor reproducing composite heads are mounted, it is possible to provide the magnetic recording drive in which the control is performed in such a way that the servo heads are switched so as to average the total time elapsed to cause the sense currents to flow through the respective magnetoresistive sensors.

As set forth hereinabove, according to the present invention, the time required for the sense current to be caused to flow through one MR reproducing head is greatly shortened. Therefore, it is possible to increase the useful life which depends on the degradation of the sensor characteristics due to the electromigration and the like. In addition, if the same useful life is allowed, the amplitude of the sense current can be increased, and the outputs of the MR reproducing heads can be increased without reduction of the reliability. Accordingly, it is possible to increase the useful life of the high output magnetic recording drive employing the MR sensors.

What is claimed is:

1. A magnetic recording drive comprising magnetic disks, magnetic heads employing magnetoresistive sensors to reproduce signals recorded in the medium, an actuator, a voice coil motor, a R-W circuit, and a current reducing arrangement for reducing a current flow through respective said magnetoresistive sensors during a track following operation, to less than a current flow during a recorded signal reproducing operation.

2. A magnetic recording drive according 1, wherein said current reducing arrangement includes a switching arrangement for only allowing the current flow through different subsets of said magnetoresistive sensors during different following operations such that the current flow is averaged among the magnetoresistive sensors.

3. A magnetic recording drive according to claim 1, wherein said current reducing arrangement more specifically reduces the current flow through said magnetoresistive sensors during the track following operation to be equal to or lower than ½ of the current flow during the recorded signal reproducing operation.

4. A magnetic recording drive according to claim 1, wherein said current reducing arrangement more specifically reduces the current flow through said magnetoresistive sensors during the track following operation to be equal to or lower than ¼ of the current flow during the recorded signal reproducing operation.

5. A magnetic recording drive according to claim 1, wherein said current reducing arrangement more specifically reduces the current flow through said magnetoresistive sensors during the following operation to be equal to a zero current flow.

6. A magnetic recording drive according to claim 1, further comprising means for increasing reproducing intervals of positioning data such that not all servo data are reproduced, and reducing the sensed currents, which are caused to flow through the respective magnetoresistive sensors, to less than a current flow during a recorded signal reproducing operation, during the track following operation.

* * * * *